UNITED STATES PATENT OFFICE.

RAYMOND C. BENNER AND HARRY F. FRENCH, OF FREMONT, OHIO, ASSIGNORS, BY MESNE ASSIGNMENTS, TO NATIONAL CARBON COMPANY, INC., A CORPORATION OF NEW YORK.

ELECTRIC BATTERY.

1,303,453.  Specification of Letters Patent.  Patented May 13, 1919.

No Drawing.   Application filed December 2, 1916.  Serial No. 134,732.

*To all whom it may concern:*

Be it known that we, RAYMOND C. BENNER and HARRY F. FRENCH, citizens of the United States, and residents, respectively, of Fremont, in the county of Sandusky and State of Ohio, and Fremont, in the county of Sandusky and State of Ohio, have invented a certain new and useful Improvement in Electric Batteries, of which the following is a full, clear, and exact description.

This invention relates to electric batteries and is particularly adapted to those with an alkaline electrolyte, such as sodium of potassium hydroxid solution.

Lead peroxid has long been used as an active material in primary and secondary batteries with an acid electrolyte. However, it has heretofore been considered impractical to use lead peroxid, or other oxid of lead, in alkaline electrolytes, because the design of the cell has been limited by the tendency of the lead to dissolve and then by plating out to short circuit the cell. We have discovered a way to overcome both of these difficulties.

Elemental sulfur, when mixed with the lead peroxid which is used as the cathode in a cell having an alkaline electrolyte, has the peculiar property of preventing the lead from going into solution in the electrolyte and plating out on the zinc electrode. It is therefore possible to employ lead oxid depolarizers in cells of a design with which it has heretofore been considered incapable of use, that is, in cells having the zinc relatively close to the depolarizing element.

A further improvement effected by the addition of the sulfur is a considerable raise in voltage.

There are various ways of incorporating the sulfur in the cell, an advantageous way being merely to mix the powdered sulfur with the oxid.

The invention is not to be limited to lead peroxid ($PbO_2$) and sulfur, as the same effects are obtained when using red lead ($Pb_3O_3$) or litharge (PbO) with sulfur.

As an illustration of the effect of sulfur on lead oxid cells with alkaline electrolyte as specified, the following table will give an idea of the advantage of our improvement. The closed circuit voltages given in the table refer to those obtained upon cells on service tests.

| Depolarizer. | Sulfur. | Open circuit voltage. | Closed circuit voltage. | | |
|---|---|---|---|---|---|
| | | | Initial. | After 3 days. | Avg. during test. |
| $PbO_2$ | None. | 1.46 | 1.18 | .63 | .625 |
| $PbO_2$ | 8–10% | 1.58 | 1.23 | .84 | .745 |
| $Pb_3O_4$ | None. | .74 | .70 | .47 | .563 |
| $Pb_3O_4$ | 8–10% | 1.04 | .72 | .74 | .636 |
| PbO | None. | .76 | .69 | .60 | .613 |
| PbO | 8–10% | 1.04 | .90 | .60 | .629 |

Inasmuch as soluble sulfids and a number of insoluble sulfur compounds will increase the voltage of a copper oxid cell, as set forth and claimed in our copending application filed October 5, 1916, Serial No. 123,856, we believe that under certain conditions such compounds of sulfur may be used with lead peroxid instead of elemental sulfur. Our invention is therefore not to be limited to sulfur, as it extends to the use of chemical equivalents of sulfur. We also find that the added sulfur has the property of raising the voltage of various other oxids when the latter are used as depolarizers. As examples of such, we may mention ferric oxid ($Fe_2O_3$), antimony trioxid ($Sb_2O_3$), cadmium oxid (CdO) and cerium oxid ($CeO_2$).

Having described our invention, what we claim is:—

1. In electric batteries with alkaline electrolyte, an oxid of lead having sulfur intimately mixed therewith.

2. In electric batteries with alkaline electrolyte, a negative element containing lead peroxid and sulfur mixed therewith.

In testimony whereof, we hereunto affix our signatures.

RAYMOND C. BENNER.
HARRY F. FRENCH.